(12) United States Patent
Schaefer et al.

(10) Patent No.: US 11,714,773 B2
(45) Date of Patent: *Aug. 1, 2023

(54) SYSTEM AND METHOD TO SELECTIVELY REDUCE USB-3 INTERFERENCE WITH WIRELESS COMMUNICATION DEVICES

(71) Applicant: DELL PRODUCTS L.P., Round Rock, TX (US)

(72) Inventors: Richard Schaefer, Austin, TX (US); Daniel W. Kehoe, Cedar Park, TX (US); Derric C. Hobbs, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,315

(22) Filed: Dec. 20, 2021

(65) Prior Publication Data

US 2022/0114127 A1      Apr. 14, 2022

Related U.S. Application Data

(63) Continuation of application No. 16/871,632, filed on May 11, 2020, now Pat. No. 11,238,001.

(51) Int. Cl.
*G06F 13/40* (2006.01)
*G06F 9/4401* (2018.01)
*G06F 13/42* (2006.01)

(52) U.S. Cl.
CPC ........ *G06F 13/4068* (2013.01); *G06F 9/4403* (2013.01); *G06F 13/4282* (2013.01); *G06F 2213/0042* (2013.01)

(58) Field of Classification Search
CPC ............... G06F 13/4068; G06F 9/4403; G06F 13/4282; G06F 2213/0042
USPC ............ 710/8, 16, 31, 33, 38, 104, 106, 306
See application file for complete search history.

(56) References Cited

U.S. PATENT DOCUMENTS

| | | |
|---|---|---|
| 8,340,580 B1 | 12/2012 | Epstein |
| 10,311,000 B2 | 6/2019 | Tan et al. |
| 2012/0076501 A1 | 3/2012 | Ko et al. |
| 2013/0212306 A1 | 8/2013 | Liu |
| 2014/0215234 A1 | 7/2014 | Hayashi |
| 2014/0268445 A1 | 9/2014 | Vemula et al. |
| 2015/0295600 A1 | 10/2015 | King et al. |
| 2015/0331826 A1 | 11/2015 | Ghosh et al. |
| 2016/0259005 A1 | 9/2016 | Menon et al. |
| 2016/0378704 A1 | 12/2016 | Adamson et al. |
| 2017/0364114 A1 | 12/2017 | Sporck et al. |
| 2019/0018802 A1 | 1/2019 | Chellappan et al. |
| 2019/0121771 A1 | 4/2019 | Kadgi |

*Primary Examiner* — Farley Abad
*Assistant Examiner* — Henry W Yu
(74) *Attorney, Agent, or Firm* — Larson Newman, LLP

(57) ABSTRACT

An information handling system includes a processor that provides a USB-2 channel and a USB-3 channel to a device. The device provides the USB-2 and -3 channels to selected ports. Each port includes a USB-3 enable setting. When the USB-3 enable setting for each particular USB port is in a first state, the associated device USB-3 channel is active, and when the USB-3 enable setting for each particular USB port is in a second state, the associated device USB-3 channel is inactive. The USB-3 enable setting for at least one of the USB ports is placed into the second state to reduce electromagnetic interference between the associated USB-3 channel and an antenna.

20 Claims, 4 Drawing Sheets

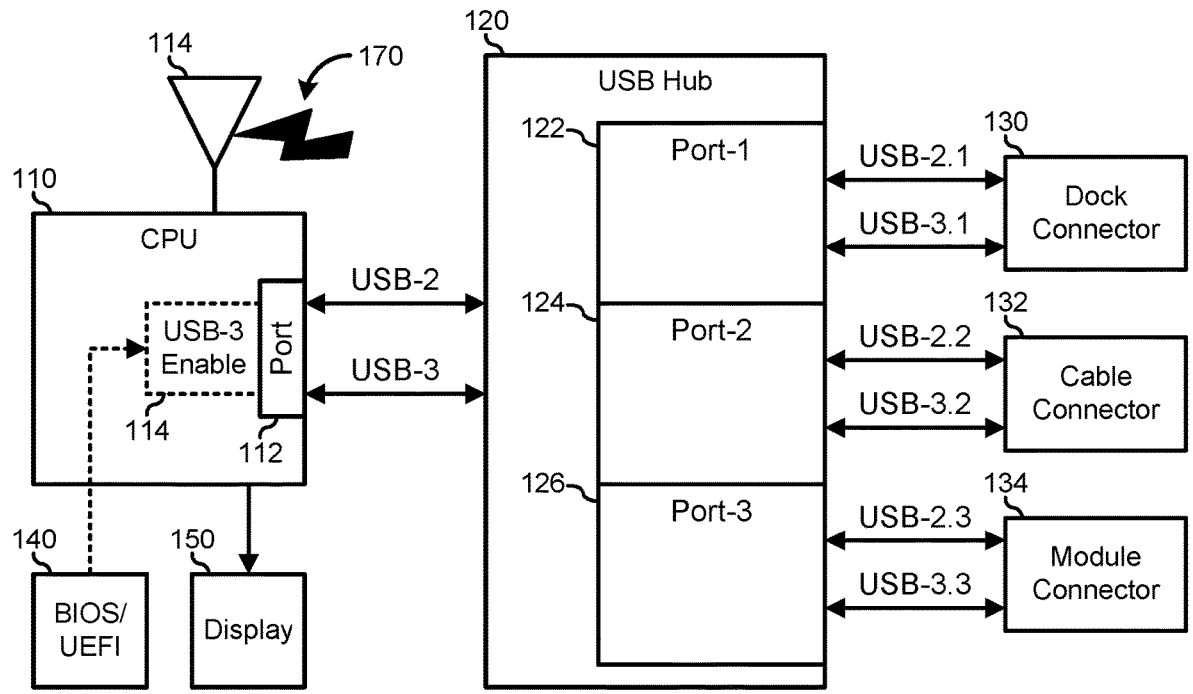
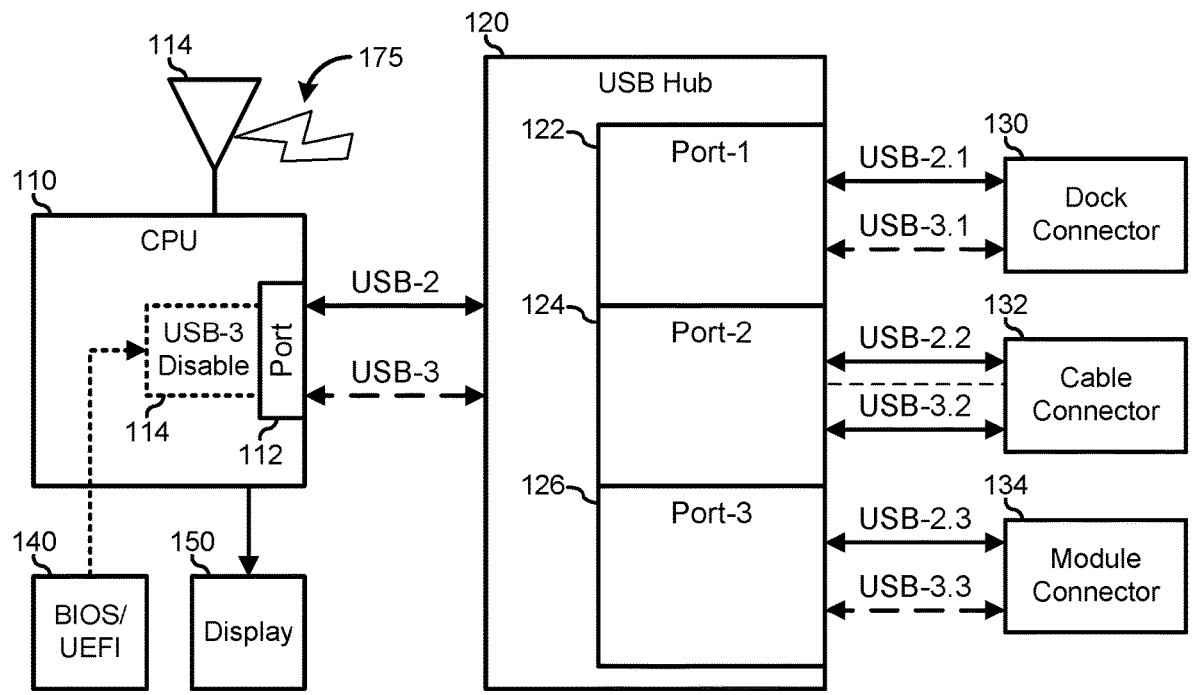
*FIG. 1 (Prior Art)*

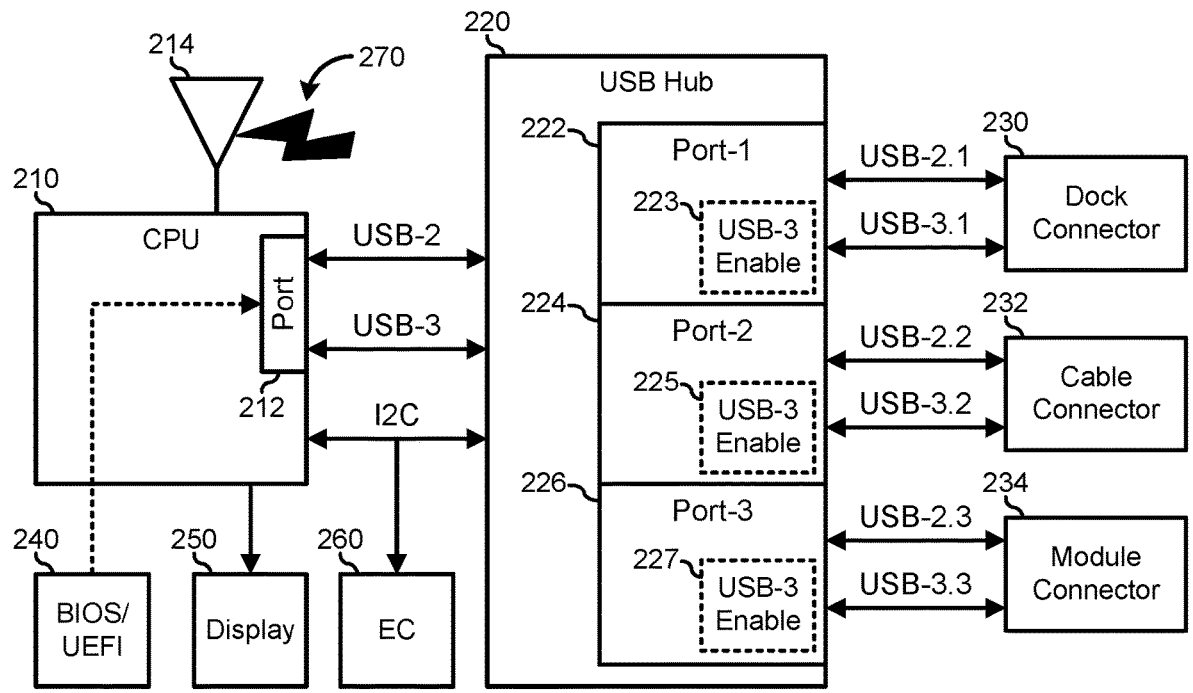
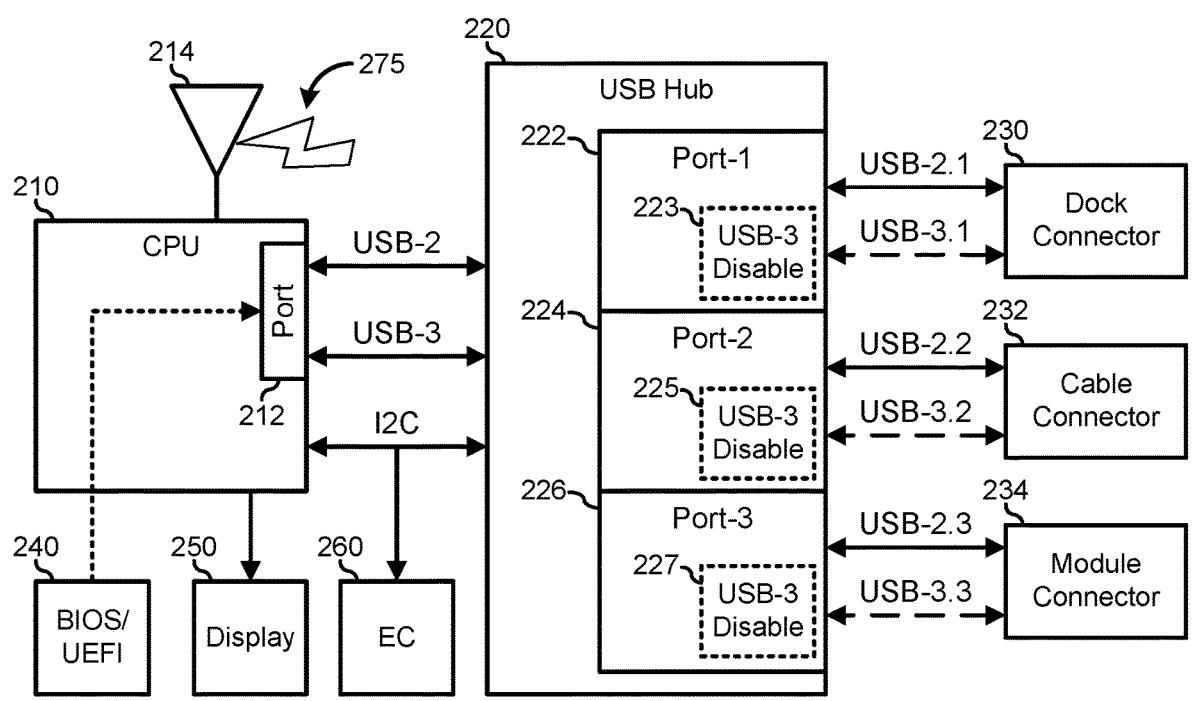
FIG. 2

BIOS/UEFI Configuration

USB 3.1 Set-up Options (Select One)

Automatic (Highly Recommended)

○ Automatic Mode

Preset Options (Recommended)

● Balanced Mode (Good Performance And Location Services)

○ High Performance Mode (All USB 3.1 Ports Enabled)

○ High GPS Accuracy Mode (No USB 3.1 Ports Enabled)

Advanced Options (Recommended for Advanced Users Only)

○ Advanced Mode

___ Select Mode (0-7)

| Mode | Port 1 | Port 2 | Port 3 |
|---|---|---|---|
| 0 - 0b000 | Enable | Enable | Enable |
| 1 - 0b001 | Enable | Enable | Disable |
| 2 - 0b010 | Enable | Disable | Enable |
| 3 - 0b011 | Enable | Disable | Disable |
| 4 - 0b100 | Disable | Enable | Enable |
| 5 - 0b101 | Disable | Enable | Disable |
| 6 - 0b110 | Disable | Disable | Enable |
| 7 - 0b111 | Disable | Disable | Disable |

SYSTEM AND METHOD TO SELECTIVELY REDUCE USB-3 INTERFERENCE WITH WIRELESS COMMUNICATION DEVICES

CROSS-REFERENCE TO RELATED APPLICATION

This application is a Continuation of U.S. patent application Ser. No. 16/871,632 entitled "SYSTEM AND METHOD TO SELECTIVELY REDUCE USB-3 INTERFERENCE WITH WIRELESS COMMUNICATION DEVICES" filed on May 11, 2020, the disclosure of which is hereby expressly incorporated by reference in its entirety.

FIELD OF THE DISCLOSURE

This disclosure generally relates to information handling systems, and more particularly relates to selective reduction of usb-3 interference with wireless communication devices in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor that provides a USB-2 channel and a USB-3 channel to a device. The device may provide the USB-2 and -3 channels to selected ports. Each port may include a USB-3 enable setting. When the USB-3 enable setting for each particular USB port is in a first state, the associated device USB-3 channel may be active, and when the USB-3 enable setting for each particular USB port is in a second state, the associated device USB-3 channel may be inactive. The USB-3 enable setting for at least one of the USB ports may be placed into the second state to reduce electromagnetic interference between the associated USB-3 channel and an antenna.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1 is a block diagram illustrating an information handling system according to the prior art;

FIG. 2 is a block diagram illustrating an information handling system according to an embodiment of the present disclosure;

FIG. 3 is a view of a BIOS/UEFI set-up screen of an information handling system according to an embodiment of the present disclosure.

The use of the same reference symbols in different drawings indicates similar or identical items.

DETAILED DESCRIPTION OF DRAWINGS

Figure 4:
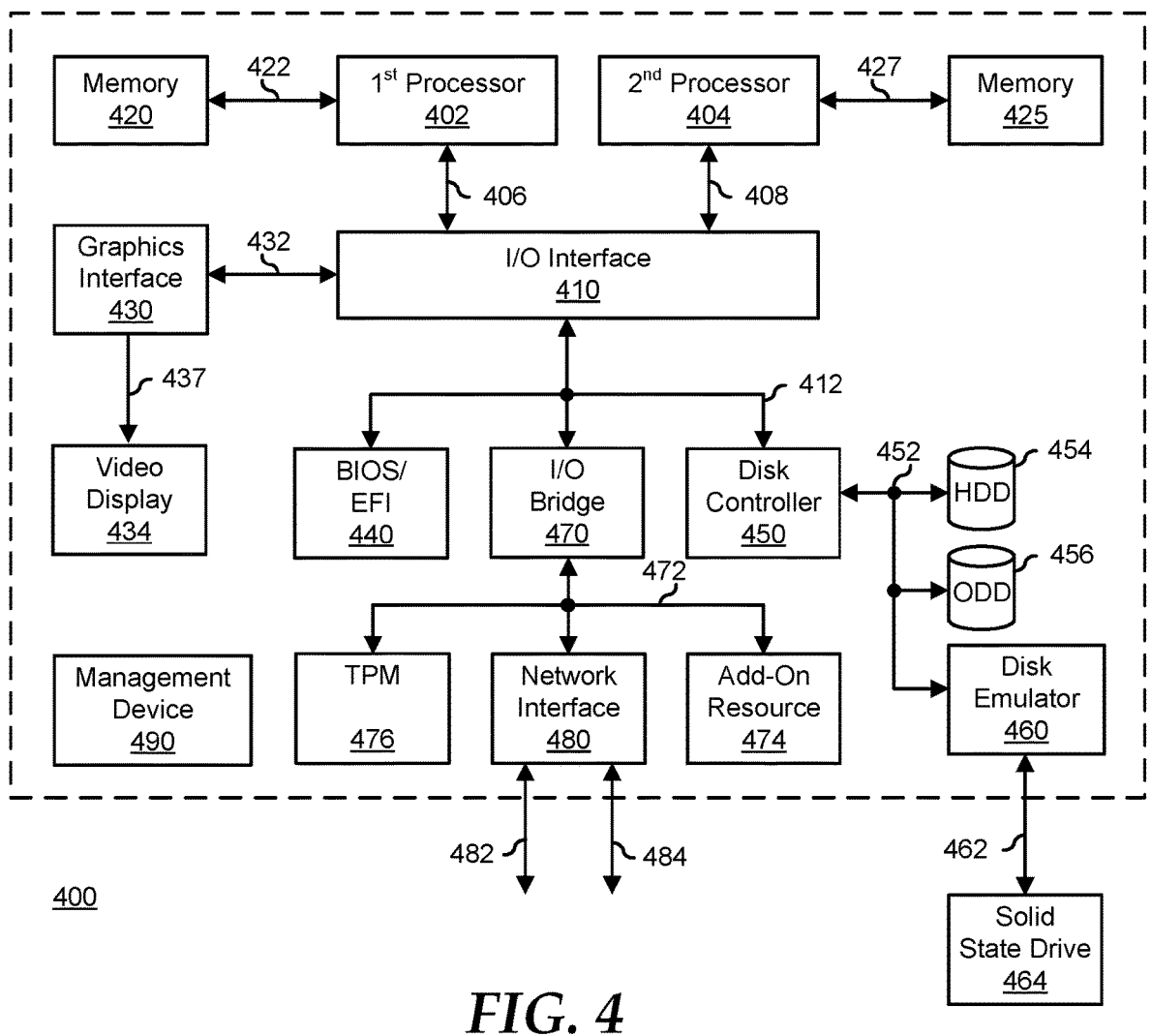
FIG. 4 is a block diagram illustrating a generalized information handling system according to another embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIG. 1 illustrates an information handling system 100 according to the prior art. Information handling system 100 includes a general-purpose processor (CPU) 110, a wireless communication antenna 114, a Universal Serial Bus (USB) hub 120, a dock connector 130, a cable connector 132, a module connector 134, a Basic Input/Output System/Universal Extensible Firmware Interface (BIOS/UEFI) module 140, and a display device 150. CPU 110 represents a processor, along with other elements of an information handling system that operate generally to provide the functions and features typical of a computer system, and may be understood to include other elements, such as memory devices, I/O hubs, storage devices, communication devices, and the like. In particular, CPU 110 includes one or more wireless communication interface (not illustrated) that is connected to antenna 114 to provide wireless communications with other devices remote from information handling system 100. Examples of wireless communication interfaces may include near field communication interfaces such as Bluetooth or Bluetooth Low Energy interfaces or other near field communication interfaces, medium range communication interfaces such as 802.11 WiFi interfaces or other medium range communication interfaces, wide-area communication interfaces such as the various third-, fourth-, or fifth-generation (3G, 4G, or 5G) cellular communication interfaces or other wide-area communication interfaces, global positioning communication interfaces such as a Global Positioning System (GPS) interface, or other wireless communication interfaces, as needed or desired. Each wireless communication interface will be understood to operate at one or more characteristic operating frequency. CPU 110 includes a USB port 112, illustrated here as a pair of USB channels that are connected to USB hub 120: a second generation USB (USB-2) channel and a third generation USB (USB-3) channel.

USB hub 120 operates to receive the USB-2 and USB-3 channels from CPU 110, and to split the USB-2 and USB-3 channels to be connected to three ports 122, 124, and 126. Port 122 is connected to dock connector 130 via a USB-2 channel (USB-2.1) and a USB-3 channel (USB-3.1). Port 124 is connected to cable connector 132 via a USB-2 channel (USB-2.2) and a USB-3 channel (USB-3.2). Port 126 is connected to module connector 134 via a USB-2 channel (USB-2.3) and a USB-3 channel (USB-3.3). Dock connector 130 represents a non-standard USB connector that is designed by a manufacturer of information handling system 100, and that is intended to be mated to a complimentary USB connector on a docking station. For example, where information handling system 100 represents a laptop computer system or tablet device, the information handling system may be accessorized with a docking station that provides expanded power and I/O capabilities to the information handling system, typically as in a fixed location, where larger accessories may be accommodated, such as an additional monitor, a keyboard, a mouse, and the like. Cable connector 132 represents a USB connector that permits the installation of a standard USB cable to connect information handling system 100 with various add-in devices, such as thumb drives, attached storage devices, or other add-in devices, as needed or desired. An example of cable connector 132 may include a USB-3 Type-A connector, a USB-3 Type-B connector, a proprietary USB connector, or another standard or non-standard USB connector, as needed or desired.

Module connector 134 represents another non-standard USB connector that is designed by the manufacturer of information handling system 100, and that is intended to be mated to a complimentary USB connector on an expansion module. Following the example where information handling system 100 represents a laptop computer system or tablet device, the information handling system may be accessorized with an expansion module that provides expanded power and I/O capabilities to the information handling system similar to the docking station described above, except that the expansion module may be more portable, such as by being attached to a back side of the information handling system.

CPU 110 includes a USB-3 enable setting 114, such as a register location, or the like, that selects whether or not to enable the USB-3 channel of port 112. As such, FIG. 1 illustrates information handling system 100 configured with the USB-3 channel enabled (top figure, labeled "100-A"), and configured with the USB-3 channel disabled (bottom figure, labeled "100-B"). Further, where the USB-3 channel is disabled, the USB-3 channels between port 112 and USB hub 120, between port 122 and dock connector 130, between port 124 and cable connector 132, and between port 124 and module connector 134 are illustrated with dashed lines, indicating that the USB-3 functionality has been disabled. It will be understood herein that, with reference to USB-3 enable settings as described herein, the terms "enabled," "enabled," "disable," and "disabled" refer functionally to the operation of the respective USB-3 channel, and not necessarily to a logic level, such as where a bit location of a register is "set" (written with a "1"), or "cleared" (written with a "0"), and the enabling or disabling of a particular USB-3 enable setting may be provided as needed or desired to carry out the disclosed functionality.

Information handling system 100 instantiates a BIOS/UEFI on BIOS/UEFI module 140. The BIOS/UEFI may include a setting option to enable or disable the USB-3 channel by setting or clearing USB-3 enable setting 114, based upon a user preference. It will be understood that, because USB-3 enable setting 114 operates within CPU 110, when the SSB-3 enable setting is disabled, information handling system 100 will be effectively limited in operation to USB-2 data rates and data throughput on all of ports 122, 124, and 126. Here, for example, during a system boot process of information handling system 100, when USB-3 enable setting 114 is disabled, the initialization process for USB functionality may not enable the USB functionality on any of the downstream ports. CPU 110 further includes a video interface (not illustrated) that is connected to display device 150. The BIOS/UEFI typically provides for the display of the various setting options on display device 150, and for a user to change the various setting options as needed or desired. Here, a display may be provided that permits the user set or clear USB-3 enable setting 114, and thus to enable or disable the USB-3 functionality of information handling system 100.

Given the operating frequency of USB interfaces, and particularly of USB-3 interfaces that are in accordance with the USB 3.1 specification, harmonics of the operating frequency may interfere with one or more of the wireless communication interfaces, particularly by operation of coupling to the harmonics 170 into antenna 114. In particular, where antenna 114 represents a GPS antenna for a GPS functionality of information handling system 100, it will be understood that the intended received signal from the GPS satellite network may be small in comparison with the harmonic content generated by the USB-3 interfaces. For example, the USB-3 operating frequency of 2.4-2.5 GHz may produce harmonics that interfere with the L1 (1575.42 MHz) and the L3 (1227.60 MHz) GPS operating frequencies. Typical solutions posed to reduce the introduction of harmonics into antenna 114 include providing greater shielding of USB devices or USB connectors in an information handling system, physically locating antennas as far as possible away from USB devices in the information handling system, or disabling USB-3 functionality in the information handling system. The solution of disabling USB-3 functionality, as shown by the lower figure 110-B, reduces the harmonic coupling 175, but does not permit the greatest performance level for the information handling system, and a user is therefore faced with a choice of poor performance, or poor GPS location functionality. In particular, where information handling system 100 represents a laptop computer or tablet device, the ability to provide greater shielding or to physically locate antennas far from the USB devices may be very limited due to the space and routing constraints of the laptop computer or tablet form factors.

FIG. 2 illustrates an embodiment of an information handling system 200. Information handling system 200 includes a general-purpose processor (CPU) 210, a wireless communication antenna 214, a Universal Serial Bus (USB) hub 220, a dock connector 230, a cable connector 232, a module connector 234, a BIOS/UEFI module 240, a display device 250, and an embedded controller 260. CPU 210 is similar to CPU 110 and includes one or more wireless communication interface (not illustrated) that is connected to antenna 214 to provide wireless communications with other devices remote from information handling system 200. CPU 210 includes a USB port 212, illustrated here as a pair of USB channels that are connected to USB hub 220: a second generation USB (USB-2) channel and a third generation USB (USB-3) channel. CPU 210 is also connected to USB hub 220 via an Inter-Integrated Circuit (I2C) interface. It will be understood that the I2C interface represents a management interface that can include a System Management Bus (SMBus), Low Pin Count (LPC) interface, an Improved Inter-Integrated Circuit (I3C) interface, or another interface, as needed or desired.

USB hub 220 is similar to USB hub 120, operating to receive the USB-2 and USB-3 channels from CPU 210, and to split the USB-2 and USB-3 channels to be connected to three ports 222, 224, and 226. Port 222 is connected to dock connector 230 via a USB-2 channel (USB-2.1) and a USB-3 channel (USB-3.1). Port 224 is connected to cable connector 232 via a USB-2 channel (USB-2.2) and a USB-3 channel (USB-3.2). Port 226 is connected to module connector 234 via a USB-2 channel (USB-2.3) and a USB-3 channel (USB-3.3). Connectors 230, 232, and 234 are similar to respective connectors 130, 132, and 134. USB hub 220 differs from USB hub 120 in that USB hub 220 includes a USB-3 enable setting associated with each one of ports 222, 224, and 116. In particular, port 222 includes a USB-3 enable setting 223, port 224 includes a USB-3 enable setting 225, and port 226 includes a USB-3 enable setting 227. USB-3 enable settings 223, 225, and 227 may represent a register location, or the like, that selects whether or not to enable the USB-3 channel of the respective ports 222, 224, and 226. As such, FIG. 2 illustrates information handling system 200 configured with all the USB-3 channels enabled (top figure, labeled "200-A"), and configured with the USB-3 channels of ports 222, 224, and 226 disabled (bottom figure, labeled "200-B"). Here, the USB-3 channels between port 222 and dock connector 230, between port 224 and cable connector 232, and between port 224 and module connector 234 are illustrated with dashed lines, indicating that the USB-3 functionality has been disabled for all three ports. However, it will be understood that any combination of one, two, or all three USB-3 interfaces from ports 222, 224, and 226 can be disabled at any time by setting the associated USB-3 enable settings 223, 225, and 227, as needed or desired.

Information handling system 200 instantiates a BIOS/UEFI on BIOS/UEFI module 240. The BIOS/UEFI may include a setting option to enable or disable the USB-3 channels by setting or clearing USB-3 enable settings 223, 225, and 227, based upon a user preference. It will be understood that CPU 210 may include a USB-3 enable setting similar to USB-3 enable setting 114. Here, when such a USB-3 enable setting is disabled, information handling system 200 will be effectively limited in operation to USB-2 data rates and data throughput on all of ports 222, 224, and 226, similar to information handling system 100. However, when such a USB-3 enable setting is enabled, one or more of the USB-3 channels of ports 222, 224, and 226 may be disabled without impacting the USB-3 channel between CPU 210 and USB hub 220, and without impacting the USB- channels from the other ports that have their USB enable settings enabled. CPU 210 further includes a video interface (not illustrated) that is connected to display device 250. The BIOS/UEFI typically provides for the display of the various setting options on display device 250, and for a user to change the various setting options as needed or desired. Here, a display may be provided that permits the user set or clear USB-3 enable setting 214, and thus to enable or disable the USB-3 functionality of information handling system 200.

As noted above, the operating frequency of USB-3 interfaces may include harmonics that may interfere with one or more of the wireless communication interfaces, as illustrated by the coupled harmonics 270 into antenna 114. The solution of selectively disabling one or more USB-3 interface, as shown by the lower figure 210-B, reduces the harmonic coupling 275, and permits the flexibility to balance the performance level for the information handling system with the level of GPS location performance. Thus, because dock connector 230, cable connector 232, and module connector 234 each represent opportunities for different usages of information handling system 200, and because different combinations of enabling and disabling of the USB-2 channels may introduce varying degrees if interference with antenna 214, a user may choose different combinations of enablement and disablement of the USB-3 channels in accordance with the user's needs or preferences.

For example, because dock connector 230 is may be used when a user connects information handling system 200 to a desktop docking station, then, there may be little need for highly accurate GPS information, and so the information handling system can be configured to enable all USB-3 channels. On the other hand, module connector 234 may physically incompatible with the use of a docking station, for example where both connectors are located on a back surface of information handling system 200, and so the addition of an extension module may imply that the user is operating in a mobile mode, therefore indicating a desire for more accurate GPS information. However, the use of the extension module may be understood to indicate that the user wishes some enhanced functionality as provided by the extension module, and that the decreased USB-3 channel performance on the extension module may not be desirable. Here, a trade-off can be made where only the USB-3 channel associated with port 226 is enabled, but where the USB-3 channels for ports 222 and 224 are disabled.

FIG. 3 illustrates a BIOS/UEFI set-up screen 300 of an information handling system. BIOS/UEFI set-up screen 300 provides three levels of control over the enablement and disablement of the USB-3 channels of the information handling system: an automatic option, a selectable presets option, and an advanced option. In the automatic option, the information handling system automatically selects which USB-3 channels to enable and which to disable. Here, for example, a manufacturer may implement a decision logic that takes into account various operating parameters within the information handling system, and then select the enablement and disablement scheme based upon the operating parameters. An example may include determining that the information handling system is docked with the docking station. In another example, the information handling system may briefly disable all USB-3 channels for a short duration after various motion sensors of the information handling system indicate that the information handling system is stationary, in order for a GPS system of the information handling system to fix a precise location, and then to reenable the USB-3 channels after the precise location is fixed.

In the selectable present option, a user selects from a small number of options that each represent a broadly subjective user experience, such as a high performance mode, a high GPS accuracy mode, and a balanced mode. In this example, the information handling system will implement a particular combination of enablements and disablements that are known to deliver the subjective user experiences, based upon design considerations and the like. In the advanced option, a user may have direct access to each of the USB-3 enable settings, and so can fashion a usage mode, according to the user's needs or preferences. For example, where the information handling system includes three USB-3 channels, there may be eight possible combinations of enablements and disablements, as illustrated in BIOS/UEFI set-up screen 300. A BIOS/UEFI set-up screen such as BIOS/UEFI set-up screen 300 will typically be accessed prior to a system boot process for the information handler, and so may not be suitable for dynamic selection of the enablement and disablement of the USB-3 channels on the information handling system. However, it will be further understood that the options as presented on BIOS/UEFI set-up screen 300, and the functionality enabled thereby, as described above, may also be provided during a run time environment of the information handling system, permitting a user to select the enablement and disablement of the USB-3 channels "on the fly," that is, at any time during run time operation, according to the user's needs or preferences.

Returning to FIG. 2, embedded controller 260 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for information handling system 200. In particular, embedded controller 260 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. An example of embedded controller 260 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired. In a particular embodiment, embedded controller 260 operates to enable or disable the USB-3 channels via the I2C bus.

It will be understood that, while the enablement and disablement of individual USB-3 channels, as illustrated herein, are described in the context of a USB hub, this is not necessary to the teachings of the present disclosure, and other implementations of systems with high-speed data channels and sensitive wireless communication devices may likewise benefit from the teachings of the present disclosure. For example, other USB implementations may be utilized that provide USB ports with the ability to enable or disable one or both of the USB-2 channel and the USB-3 channel. Here, a BIOS screen or user interface can be provided to enable the selection of processing performance versus the performance of the wireless communication interfaces, as needed or desired. Further, other high-speed interfaces my also be found to interfere with wireless communication interfaces, and may benefit from the teachings of the present disclosure. For example, where a Peripheral Component Interconnect-Express (PCIe) interface is provided on an information handling system via a PCIe cable, such a cable may adversely interfere with wireless communication interfaces. Here, a BIOS screen or user interface can be provided to enable the selectin of processing performance versus the performance of the wireless communication interface, such as by reducing a data transfer rate on the PCIe cable. Another example may include a Serial-ATA cable. Moreover, devices that may be utilized for enabling or disabling the high-speed interfaces may include hubs, switches, or any other electrical device that prevents an aggressor signal from the high-speed interfaces from adversely impacting the wireless communication interfaces, buffers, redrivers, retimers, and the like, that include an ability to enable or disable the high-speed interfaces, or to otherwise de-rate the performance of the high-speed interfaces in order to improve the performance of the wireless communication interfaces.

FIG. 4 illustrates a generalized embodiment of an information handling system 400 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456 , a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456 , disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor to provide a processor USB-2 channel and a processor USB-3 channel; and
a USB hub device including a plurality of USB ports, each USB port to provide an associated port USB-2 channel and an associated port USB-3 channel, the USB hub device configured to receive the processor USB-2 channel and the processor USB-3 channel, to route the processor USB-2 channel to each of the port USB-2 channels, and to route the processor USB-3 channel to each enabled port USB-3 channel, wherein each USB port includes a USB-3 enable setting, wherein when the USB-3 enable setting for each particular USB port is in a first state, the associated port USB-3 channel is enabled, and wherein when the USB-3 enable setting for each particular USB port is in a second state, the associated port USB-3 channel is disabled.

2. The information handling system of claim 1, further comprising:
a Basic Input/Output System (BIOS) module operable to place the USB-3 enable setting into the second state for the at least one USB port.

3. The information handling system of claim 2, wherein the BIOS module is further operable to provide a user interface to select the at least one USB port.

4. The information handling system of claim 3, wherein the BIOS module places the USB-3 enable setting into the second state in response to a user input to the user interface.

5. The information handling system of claim 1, wherein the processor is operable to place the USB-3 enable setting into the second state for the at least one USB port during a run time operation of the information handling system.

6. The information handling system of claim 5, wherein the processor places the USB-3 enable setting into the second state in response to a user input to processor.

7. The information handling system of claim 1, further comprising:
an embedded controller operable to place the USB-3 enable setting into the second state for the at least one USB port.

8. The information handling system of claim 1, further comprising:
a Global Positioning System (GPS) interface including an antenna, wherein the USB-3 enable setting for at least one of the USB ports is placed into the second state to reduce electromagnetic interference between the associated USB-3 channel and the antenna.

9. A method, comprising:
receiving, by a Universal Serial Bus (USB) hub device of an information handling system, a processor USB-2 channel and a processor USB-3 channel from the information handling system, wherein the USB hub device includes a plurality of USB ports, each USB port to provide an associated port USB-2 channel and an associated port USB-3 channel, and wherein each USB port includes a USB-3 enable setting, wherein when the USB-3 enable setting for each particular USB port is in a first state, the associated port USB-3 channel is enabled, and wherein when the USB-3 enable setting for each particular USB port is in a second state, the associated port USB-3 channel is disabled;
routing, by the USB hub device, the processor USB-2 channel to each of the port USB-2 channels and routing the processor USB-3 channel to each enabled port USB-3 channel; and
placing the USB-3 enable setting for at least one of the USB ports into the second state.

10. The method of claim 9, further comprising:
placing, by a Basic Input/Output System (BIOS) module of the information handling system, the USB-3 enable setting into the second state for the at least one USB port.

11. The method of claim 10, further comprising:
providing, by the BIOS module, a user interface to select the at least one USB port.

12. The method of claim 11, wherein the BIOS module places the USB-3 enable setting into the second state in response to a user input to the user interface.

13. The method of claim 9, further comprising:
placing, by the processor, the USB-3 enable setting into the second state for the at least one USB port during a run time operation of the information handling system.

14. The method of claim 13, further comprising:
receiving, by the processor, a user input, wherein the processor places the USB-3 enable setting into the second state in response to the user input.

15. The method of claim 9, further comprising:
placing, by an embedded controller of the information handling system, the USB-3enable setting into the second state for the at least one USB port.

16. The method of claim 9, wherein:
the information handling system includes a Global Positioning System (GPS) interface having an antenna; and
wherein placing the USB-3 enable setting for the at least one of the USB port into the second state operates to reduce electromagnetic interference between the associated USB-3 channel and the antenna.

17. An information handling system, comprising:
a processor to provide a processor USB-2 channel and a processor USB-3 channel;
a Basic Input/Output System (BIOS) module; and
a USB hub device including a plurality of USB ports, each USB port to provide an associated port USB-2 channel and an associated port USB-3 channel, the USB hub device configured to receive the processor USB-2 channel and the processor USB-3 channel and to route the processor USB-2 channel to each of the port USB-2 channels and to route the processor USB-3 channel to each enabled port USB-3 channel;
wherein:
each USB port includes a USB-3 enable setting, wherein when the USB-3 enable setting for each particular USB port is in a first state, the associated port USB-3 channel is enabled, and wherein when the USB-3 enable setting for each particular USB port is in a second state, the associated port USB-3 channel is disabled; and
the BIOS module places a USB-3 enable setting for at least one of the USB ports into the second state.

18. The information handling system of claim 17, wherein:
- the BIOS module is further operable to provide a user interface to select the at least one USB port; and
- the BIOS module places the USB-3 enable setting into the second state in response to a user input to the user interface.

19. The information handling system of claim 17, wherein the processor is operable to place the USB-3 enable setting into the second state for the at least one USB port during a run time operation of the information handling system.

20. The information handling system of claim 19, wherein the processor places the USB-3 enable setting into the second state in response to a user input to processor.

* * * * *